April 25, 1933.  C. F. ARNOLD  1,905,978
TASSELING MACHINE
Filed Oct. 4, 1928  9 Sheets-Sheet 1

INVENTOR:
Clarence F. Arnold,
BY
ATTORNEY.

April 25, 1933.　　　C. F. ARNOLD　　　1,905,978
TASSELING MACHINE
Filed Oct. 4, 1928　　　9 Sheets-Sheet 4

WITNESSES:
Gerhard Bowle
Evelyn Crompton

INVENTOR:
Clarence F. Arnold,
BY
Joshua R. H. Potts
ATTORNEY.

April 25, 1933.   C. F. ARNOLD   1,905,978
TASSELING MACHINE
Filed Oct. 4, 1928   9 Sheets-Sheet 5
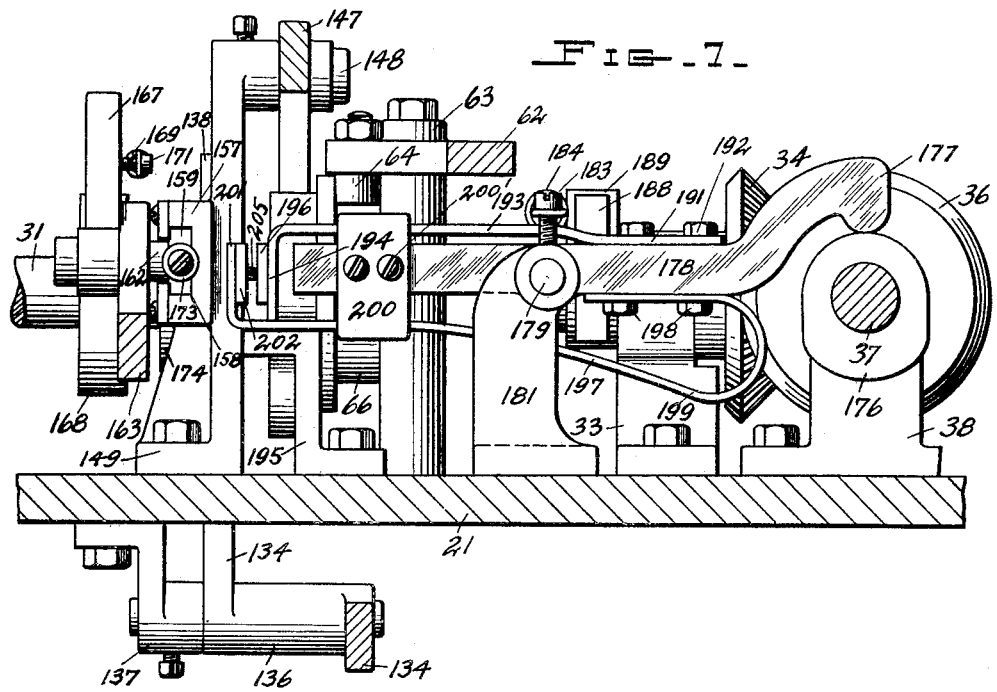
WITNESSES:
Gerhard Baule
Evelyn Crompton
INVENTOR:
Clarence F. Arnold,
BY
Joshua R. H. Potts
ATTORNEY.

April 25, 1933.  C. F. ARNOLD  1,905,978
TASSELING MACHINE
Filed Oct. 4, 1928  9 Sheets-Sheet 6
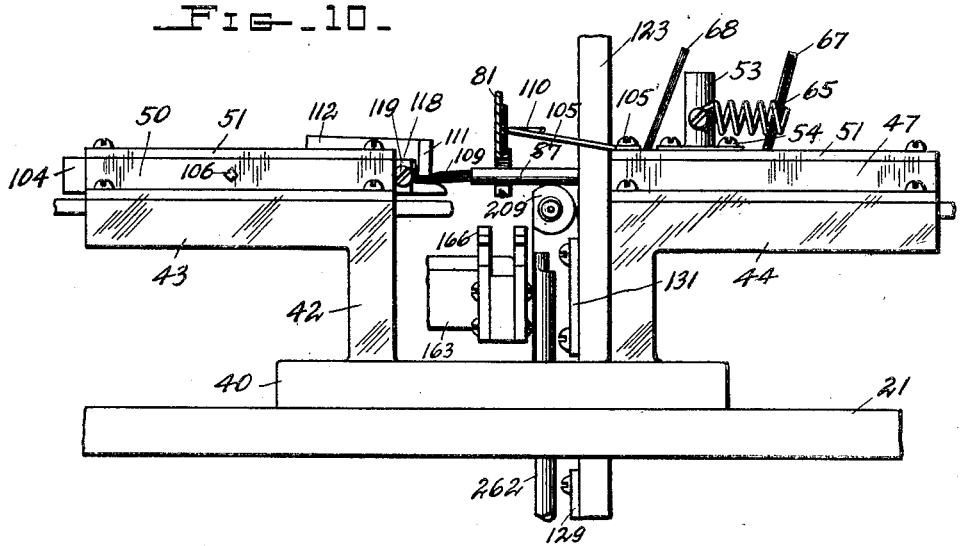
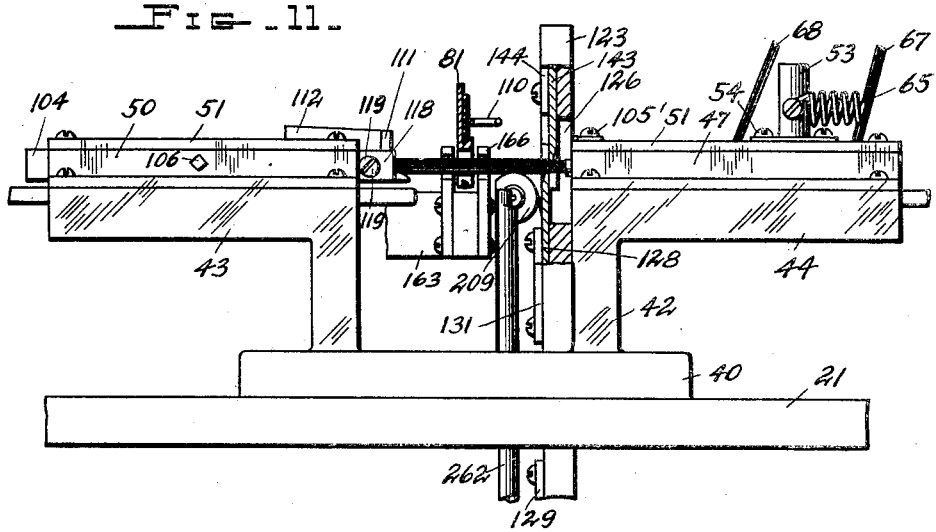
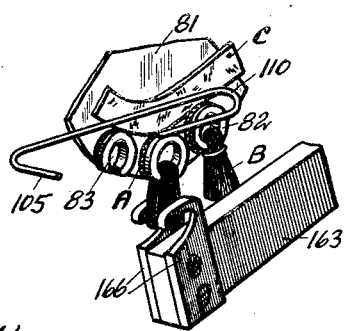
INVENTOR:
Clarence F. Arnold,
BY
Joshua R. H. Potts
ATTORNEY.
WITNESSES:
Gerhard Banke
Evelyn Crompton April 25, 1933.        C. F. ARNOLD        1,905,978
TASSELING MACHINE
Filed Oct. 4, 1928        9 Sheets-Sheet 7

WITNESSES:
Gerhard Beale
Evelyn Crompton

INVENTOR:
Clarence F. Arnold,
BY
Joshua R. H. Potts
ATTORNEY.

April 25, 1933.   C. F. ARNOLD   1,905,978
TASSELING MACHINE
Filed Oct. 4, 1928   9 Sheets-Sheet 8

WITNESSES:
Gerhard Bauer
Evelyn Crompton

INVENTOR:
Clarence F. Arnold,
BY
Joshua R. H. Potts
ATTORNEY.

April 25, 1933.          C. F. ARNOLD                1,905,978
                      TASSELING MACHINE
              Filed Oct. 4, 1928        9 Sheets-Sheet 9
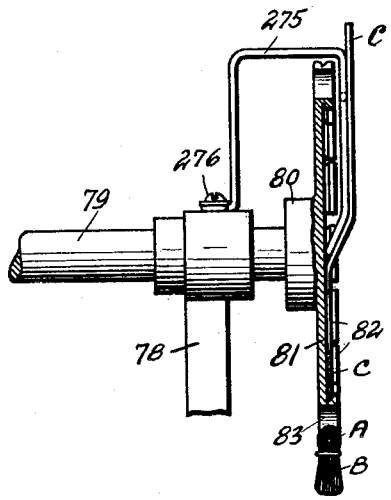
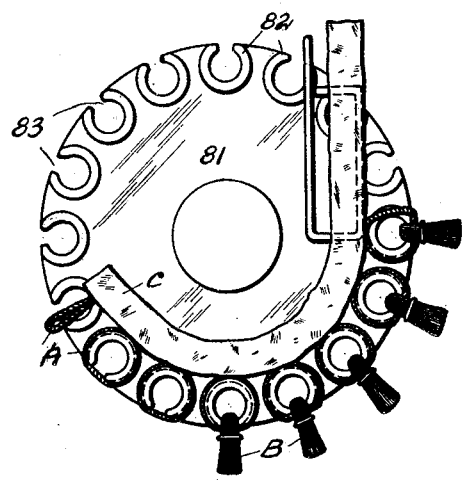
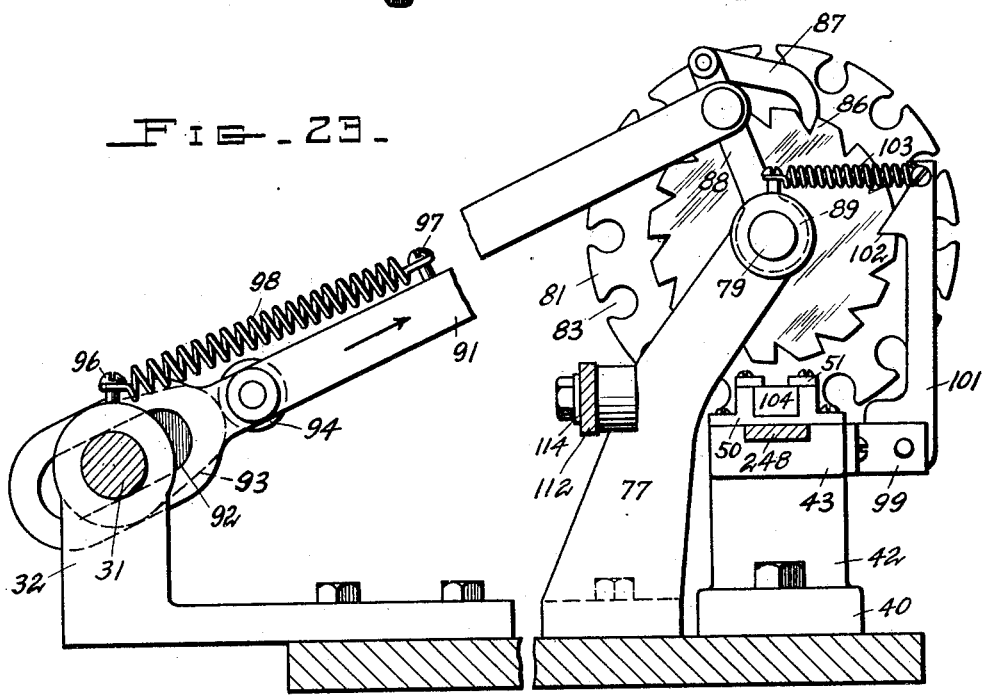

Patented Apr. 25, 1933

1,905,978

UNITED STATES PATENT OFFICE

CLARENCE F. ARNOLD, OF DREXEL HILL, PENNSYLVANIA

TASSELING MACHINE

Application filed October 4, 1928. Serial No. 310,226.

This invention relates to a tasseling machine and particularly to a machine wherein tassels are automatically formed in a continuous operation.

The object of the invention is to provide an improved tasseling machine.

Another object of the invention is to provide a tasseling machine which will be continuous in operation, thereby increasing the efficiency and reducing the cost of labor ordinarily attendant in producing tasseled articles.

Another object of the invention is to provide a tasseling machine composed of few and simple parts, unlikely to get out of order and so arranged as to be readily accessible for repairs.

Still another object of the invention is to provide a tasseling machine wherein the operator will not be required to remove the article from the machine when the tassels are formed.

According to the invention, the tasseling machine has a feeding disk provided with a plurality of peripherally grooved open bands for supporting the loops onto which the tassel is to be formed, means for extending the tassel threads through the successive loops, means for cutting the tassel threads into the required lengths, means for positioning the tassel threads on the loops, and means for completing the tassels and binding the same on the respective loops.

The invention contemplates the use of wire for binding the tassel threads into the form of tassels and the machine is provided with means for automatically positioning a wire and for cutting the same into required lengths, and means for securely wrapping the same around the tassel threads, whereby it binds the tassels on the loops.

The accompanying drawings illustrate a selected embodiment of the invention and the views therein are as follows.

Figure 1:
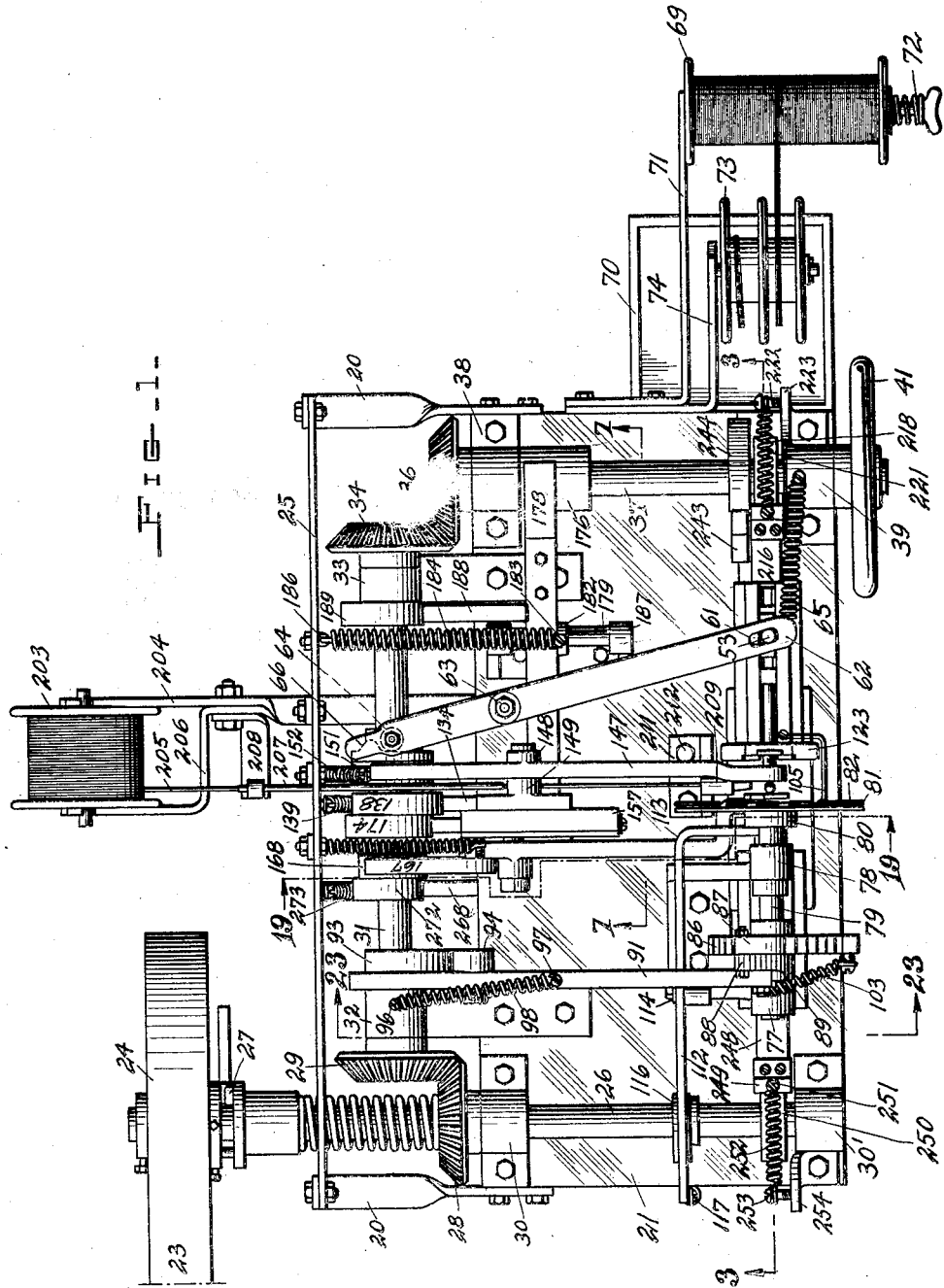
Figure 1 is a top plan view of the tasseling machine.
Figure 2:
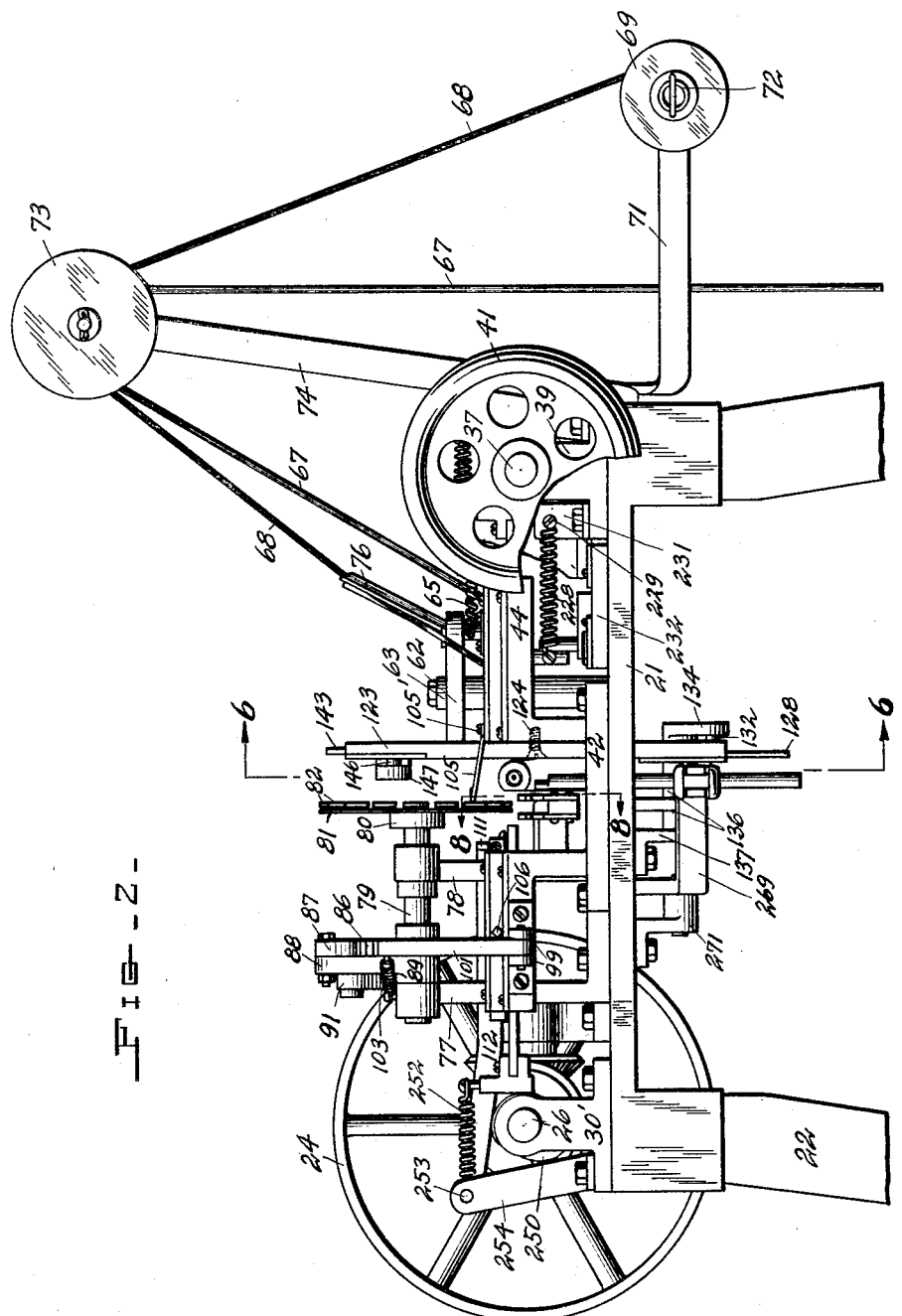
Figure 2 is a front elevation with the lower part of the frame broken away.
Figure 3:
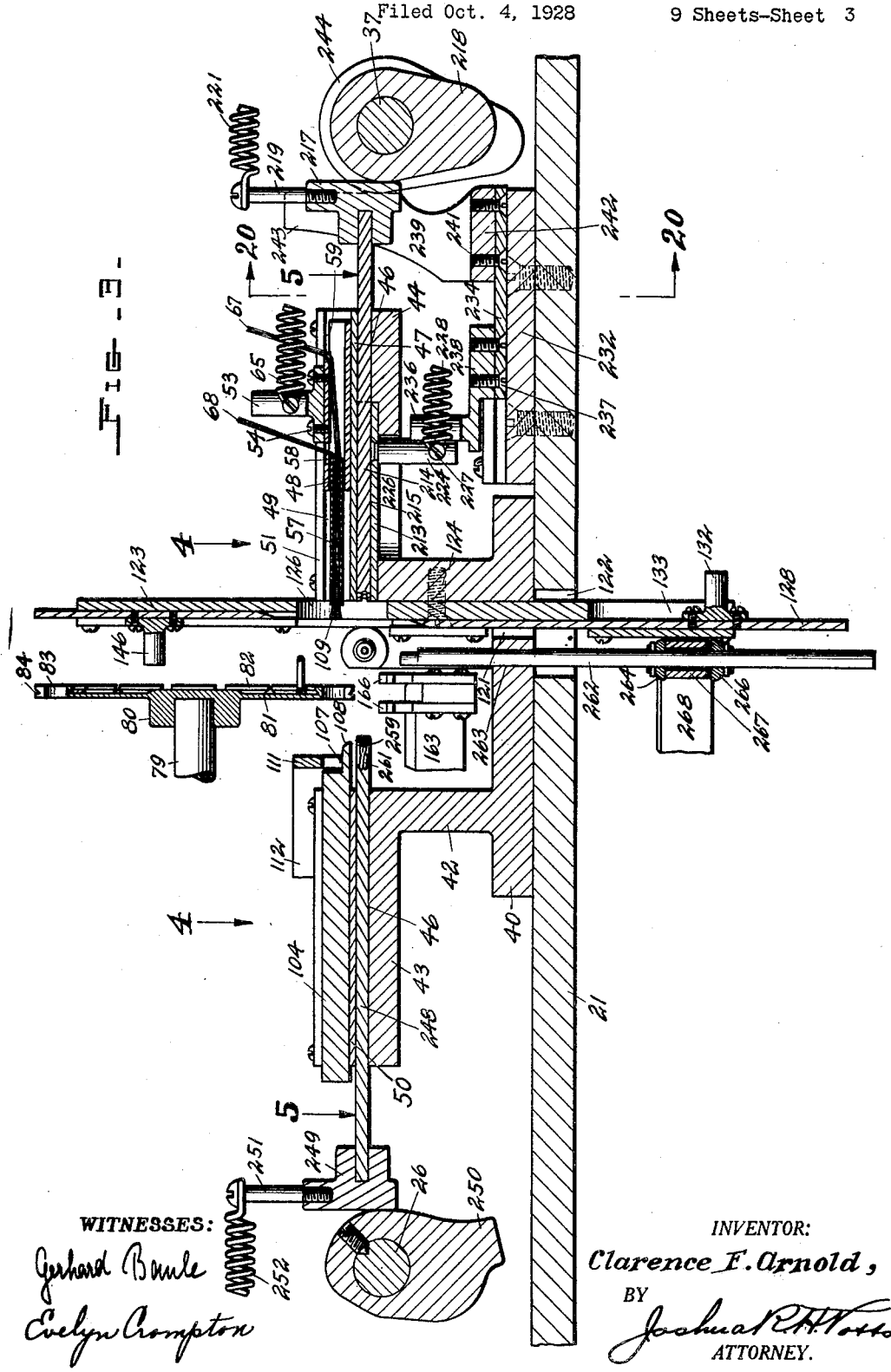
Figure 4:
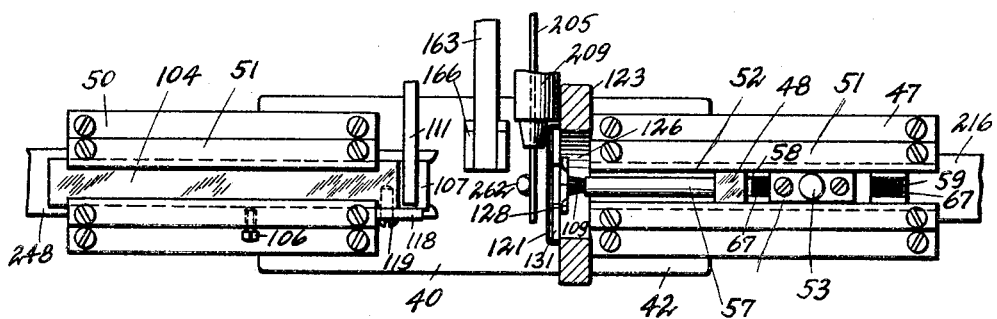
Figure 5:
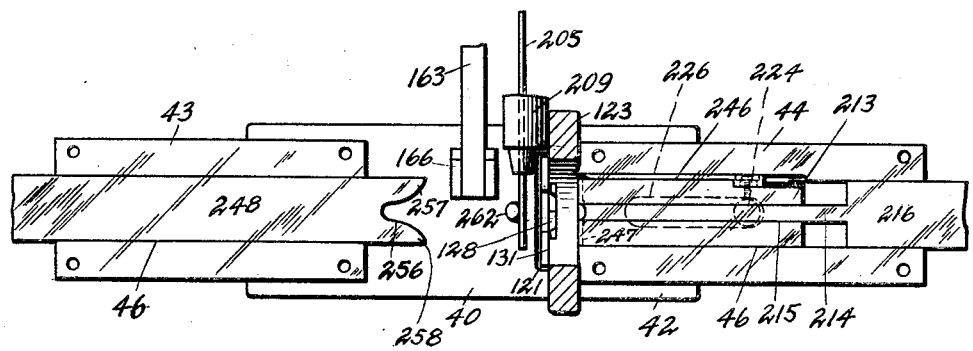
Figure 6:
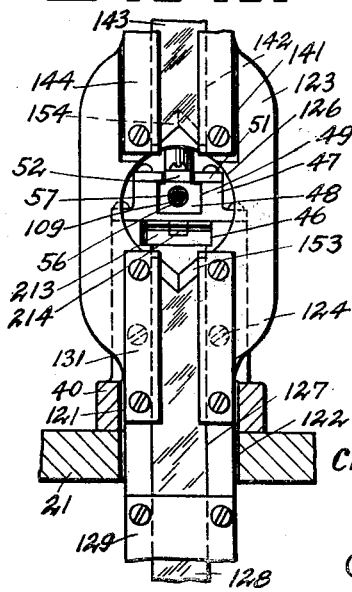
Figure 13:
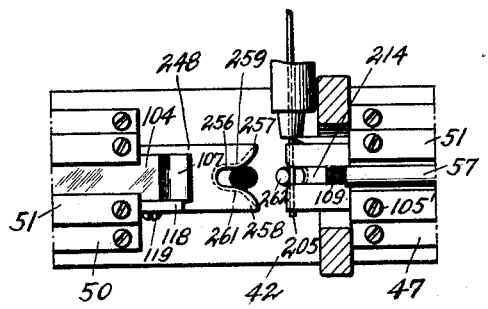
Figure 14:
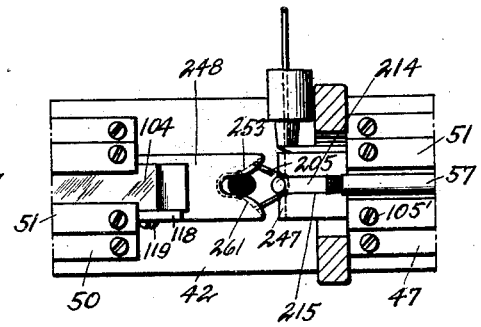
Figure 15:
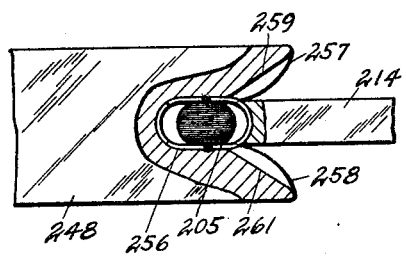
Figure 16:
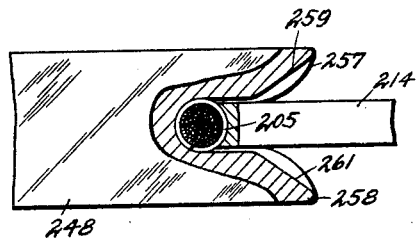
Figure 17:
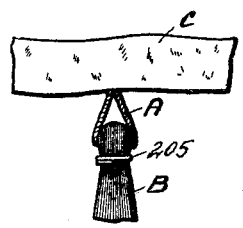
Figure 18:
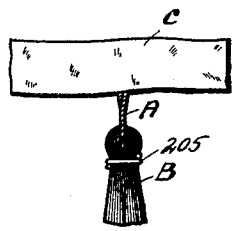
Figure 19:
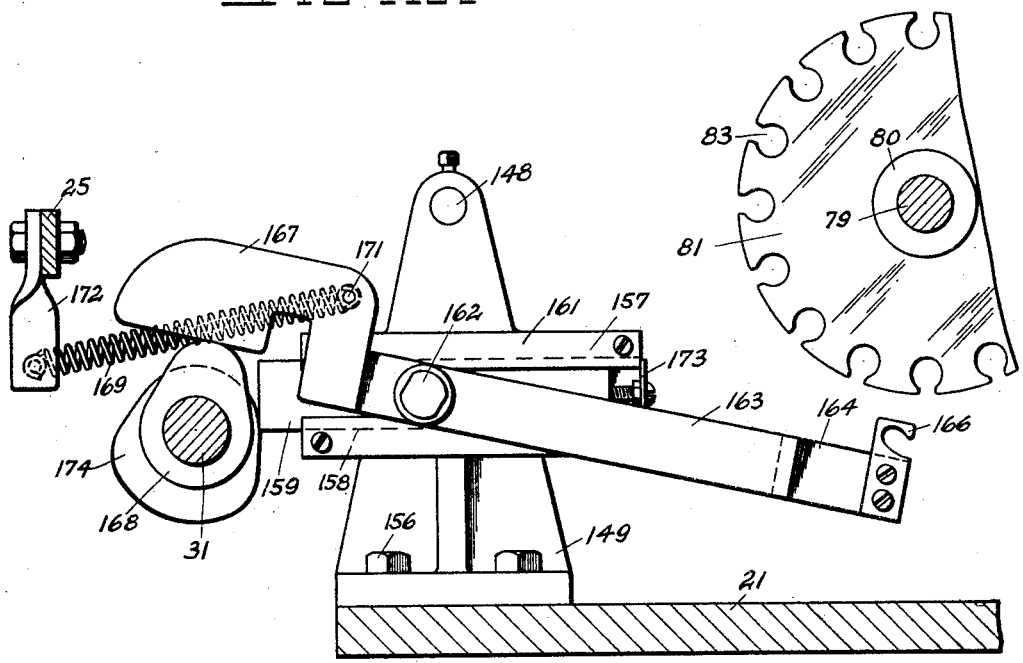
Figure 20:
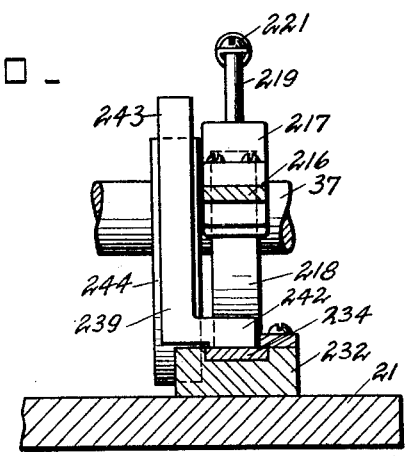

Figure 3 is a horizontal sectional view on the line 3—3 of Figure 1, looking in the direction of the arrows, Figure 4 is an enlarged plan view of a portion of the machine and may be said to be taken looking in the direction of the arrow 4 in Figure 3, Figure 5 is a similar view taken on the plane indicated by the line 5—5 of Figure 3 and looking in the direction of the arrows, Figure 6 is a fragmentary vertical sectional view taken on the line 6—6 of Figure 2 and looking in the direction of the arrows, Figure 7 is a partial vertical section taken on the line 7—7 of Figure 1 and looking in the direction of the arrows, Figure 8 is a fragmentary sectional view taken on the line 8—8 of Figure 2, looking in the direction of the arrows, Figure 9 is a front view of the feeding disk, Figure 10 is a fragmentary view showing the manner in which the tassel threads are passed through the loops and held prior to being severed, Figure 11 is a like view showing the tassel threads being severed and the hooks about to draw the tassel threads into position over the loops, Figure 12 is a perspective view and shows the manner in which the loops are placed on the open bands and the material to which the same are attached is held above the zone of operation, Figure 13 is a fragmentary plan view showing the binding wire extending adjacent the tassel threads and about to be severed from the supply, Figure 14 is a like view showing the severed wire passing into the die, which assists in fastening the same around the tassel threads, Figure 15 is a fragmentary section showing the wire further advanced in the forming dies, Figure 16 is a like view showing the final formation of the tassel, Figure 17 is a view of a completed tassel depending from one of the loops, Figure 18 is a like view with the tassel twisted, Figure 19 is a view taken substantially on the line 19—19 of Figure 1, looking in the direction of the arrows and shows the mechanism for controlling the movement of the hook bar which positions the tassel threads, Figure 20 is a vertical section which may be represented as being taken on the line 20—20 of Figure 3 but showing the parts in full, Figure 21 is a front view showing the manner of removing the tasseled loops from the disk, Figure 22 is a side view of the disk illustrating the same, and Figure 23 is a section taken on the line 23—23 of Figure 1.

In the several figures throughout the drawings, like reference characters are used to indicate like parts.

The tassel machine comprises a table 21 which is supported at a suitable height by legs or standards 22. The table has a pair of straps 20 extending out from the sides and to the rear thereof for maintaining a spring supporting bar 25.

Driving mechanism

The mechanism of the machine may be driven by a belt 23 which engages a pulley 24 which may be operatively connected to a shaft 26 through the clutch mechanism 27.

The shaft 26 is mounted in suitable bearing housings 30 and 30', and is provided with a bevel gear 28 which meshes with a bevel gear 29 on the end of the cam shaft 31. This shaft is provided with suitable bearing housings 32 and 33 which are mounted on the table 21 and said shaft is provided at its other end with a bevel gear 34 which meshes with a bevel gear 36 on the inner end of a shaft 37 operating in the bearing housings 38 and 39. The outer end of the shaft 37 is provided with a hand wheel 41 for operating the several shafts by hand, when desired.

Tassel thread—supply and feed

The table 21 is provided with a cast member 42 which has a base 40 and is provided with outwardly extending wings 43 and 44. The wings 43 and 44 are each provided with a slot 46 extending through the length of same and these slots are closed at their upper sides by slotted members 50 and 47, respectively. (See Figures 6 and 8).

The slotted member 47 has a slide 48 operating in slot 49 and the slide is held in position by means of plates 51 which provide an opening 52 between the same. The slide 48 is provided with a post 53 which extends through the opening 52 and is fastened to the slide by means of the screws 54.

The slide 48 has a circular bore 56 extending longitudinally through the same and the forward end thereof is provided with a substantially oval tube 57 which extends a considerable distance beyond the front of said slide. The upper side of the slide 48 is provided with cut-outs or openings 58 and 59.

The post 53 fits within the elongated slot 61 on the lever 62 which is pivotally mounted at the point 63 and which is provided at a point near its outer end with a roller 64 which engages the cam 66 on the shaft 31. (See Figure 1). The post 53 is yieldably connected to the bearing 39 by means of a spiral spring 65 so that the slide 48 is returned to the position shown in Figure 3 when the action of the cam 66 is completed.

The machine, as illustrated in Figure 2, is provided with cotton threads 67 and silk threads 68 for forming the tassels; the former being contained in the box 70, and the latter wound on a spool 69 carried by the strap 71 secured to the edge of the table. The spool is provided with a tension device 72 for preventing the spool from spinning.

The threads 67 and 68 are passed over a roller or spool 73 which is mounted on a bar 74 fixed to the edge of the table 21 and the cotton threads are then passed through the opening 59 in the slide 48 and lie in the bottom of the tube 57 while the silk threads 68 extend over the guide 76 and down through the opening or cut-out 58 and into the upper part of the tube 57 where they lie above the cotton thread.

The threads are arranged in the tube 57 in the manner described in order that the tassel, when formed, may have a body composed of the heavy cotton threads covered by the thinner silk threads. When the strands of thread 67 and 68 are in the tube 57, they completely fill the same and when the tube 57 is moved forward, as later explained, the tension of the combined threads in the tube is sufficient to pull the threads to cause rotation of the spools which supply the same.

Loop feed mechanism

The table 21 is provided with a pair of offset pedestals 77 and 78 which provide bearings for the shaft 79. A disk 81 is secured on the overhanging inner end of the shaft 79 by means of the collar 80 and this disk is provided with a series of equally spaced, substantially circular bands 82 having openings 83 within the same and which are open to the periphery of the disk; and each band has a peripheral groove 84 for receiving a loop A, extending from the material upon which the tassels are to be formed.

This disk is positioned between the outwardly extending wings 43 and 44 of the cast member 42 and the central lowermost open band has a common center with the tube 57 mounted in the slide 48 so that, when the said slide is operated by the lever 62, the tube will be extended centrally through that band which is in the lower vertical central position.

Secured to the shaft 79, Fig. 23, intermediate the bearing in the pedestals 77 and 78, is a ratchet wheel 86. This ratchet wheel is engaged by a pawl 87 which is loosely mounted on the end of an arm 88 which has a collar 89 loosely surrounding the shaft 79.

This arm 88 is pivotally connected to a lever 91 which has an elongated slot 92 at its outer end which fits onto the shaft 31. The shaft 31 is provided with a cam 93 which is adapted to engage a roller 94 rotatably mounted on the lever 91 for moving said lever 91 to cause feeding of the pawl 87.

The bearing housing 32 and the lever 91 are provided with screws 96 and 97, respectively, and to which screws a spiral spring 98 is fastened so that, when the cam 93 disengages the roller 94, the lever 91 will be pulled back and the arm 88 will be drawn backward, thereby dragging the tooth of the pawl 87 over a tooth on the ratchet wheel 86.

When the cam 93 engages the roller 94 on the lever 91, thereby rotating the ratchet wheel 86 in order to advance the succeeding band 82 on the disk 81 to its proper position for receiving the tube 57 containing the tassel threads, in order to prevent the pawl from spinning the ratchet wheel or for advancing it more than one full tooth, there is provided a tension or centering device. This consists of a bracket 99 fastened to the wing 43 and having an arm 101 pivoted thereto. (See Figures 2 and 23).

This arm is provided with a tooth 102 which fits the teeth on the ratchet wheel and it is held in the successive teeth by means of a spring 103 which is fastened by its one end to the outer end of said arm 101 and by its other end to the top of the bearing pedestal 77.

The cam 93 is so designed that the pawl 87 advances the ratchet wheel exactly one full tooth and the tooth 102 on the arm 101 will act as an adjustor which positively centers the successive open bands on the disk 81 at the point where the tube 57 will pass directly through the center of the same. This spring urged arm 101 also acts as a brake to prevent the lever 91 and pawl 87 from spinning the ratchet wheel 86 and disk 81 and thereby passing one or more of the loops A without forming a tassel thereon. In other words, this arm 101 insures the advancement of the disk the distance of one band 82 only for each actuation of the lever 91 and the pawl 87 by the cam 93.

The material upon which the tassel is to be formed must be provided with loops A and these loops may be formed thereon in any suitable manner. For the sake of convenience, in the description of the machine disclosed in this application, I have shown the heading C as of narrow material which may be fringe, braid or cloth goods of any width.

However, for the purpose of holding the cloth goods or fringe above the line of action in the machine and out of the way of the operating parts, a wire retaining bar 105 has its one end secured on one of the plates 51 by means of a screw 105' while its other end 110 is bent in the form of a hook and extends in close proximity to the disk 81 and immediately above the lower central band 82 where the tassels are formed. The cloth or heading passes between this hooked end 110 and the face of the disk 81.

The retaining bar 105, as illustrated in Figure 10, is intended to support narrow heading material, but other guides of a similar nature may be fastened in the same or other ways for retaining material of greater width.

*Vise or clamp for holding extended tassel threads*

The slotted member 50 has a bar 104 completely filling the slot therein and this bar is slidable in said slot and is adjustably secured by means of the set screw 106. The inner end of this bar is reduced to form a flat surface 107 which is chamfered at 108 to guide the threads extending from the end of the tube 57 onto the flat surface 107.

The flat surface 107 is almost directly in line with the lower end of the tube 57 and when the said tube is moved by the action of the lever 62, the extending threads 109 will lay upon the flat surface 107 to be engaged and secured thereon by the clamp 111.

By reference to Figure 8, a side view of the clamp 111 shows that it is formed on the end of a bar 112 which, by reference to Figure 1, is shown as turned at right angles at 113 and is pivoted at 114 on the bracket 77. The bar then extends over a cam 116 on the shaft 26 and its outer end is fastened by a spiral spring 117 to the side of the table 21.

When the outer end of the bar 112 is engaged by the face of the cam 116, the clamp 111 on the other end of the bar will be pressed downward onto flat surface 107 of the reduced end of the bar 104, and the strands of thread 109, which extend from the end of the tube 57, will be caught therebetween and held while the tube is retracted into the slotted member 47 by the action of the spring 65 fastened to the post 53 and to the bearing housing 39.

The spring 117 on the end of the bar 112 will raise the clamp 111 when the action of the cam 116 is complete. The front of the bar 104 is provided with an upstanding plate 118 secured by the screw 119 for preventing the ends 109 of the tassel threads from spreading over the edge of the flat surface 107, thereby assuring the clamping thereof by the clamp 111.

Mechanism for severing tassel lengths

The base 40 of the cast member 42 has a hole 121 extending through the same and immediately above a hole 122 in the table 21. A knife guard 123 extends vertically through these holes and is fastened to the wing 44 by the screws 124. The knife guide 123 is bellied out at or near the center of the same, as shown in Figure 6, and is provided with a circular opening 126 concentric with the circular opening 56 in the slide 48. Below the opening 126 is a slideway 127 and a cutting bar 128 is slidable therein, said bar being prevented from outward movement by means of the plates 129 and 131. (See Figure 6.)

At a point toward the lower end of the cutting bar 128, a post 132 is securely fastened to the same and this post operates in a slot 133 in the knife guide and which extends into the slideway 127. (See Figure 3.) The post 132 is pivotally mounted in the forward end of a crank lever 134 and the offset portion 136 of this crank lever is pivoted on a bracket 137 secured to the bottom of the table 21. (See Figure 2.)

The outer end of the lever 134 extends beneath the shaft 31 and rides upon a cam 138 so that, when the cam face pushes the outer end of the lever 134 down, the forward end thereof will be raised and through its connection with the cutting bar 128 by the post 132, the upper end of the cutting bar will be raised so that it passes through the path of travel of the tube 57 and through the strands of thread which have been carried through the disk 81 and whose ends 109 are retained on the bar 104 by the clamp 111. The outer end of this bar is connected to the spring supporting bar 25 through the medium of a spiral spring 139, (see Figure 1), so that when the cam action on the inner end of the crank lever is complete, the spring will raise the same and through its pivotal connection at 136 on the bracket 137, the forward end of the lever will be lowered and the cutting bar will, therefore, be returned to its initial position, as shown in Figure 6.

That part of the knife guide which extends above the circular opening 126 is cut back beyond the line of that portion extending below the circular opening, as shown at 141 in Figures 6 and 3, and this portion of the knife guide is also provided with a slideway 142 for receiving a cutting bar 143, said cutting bar being retained in said slide by the plates 144. (See Figure 6.)

Extending outward through the slot formed between the plates 144 and securely fastened to the cutting bar 143 is a post 146, (see Figure 3), which extends into the forward end of a lever 147 by a pivotal connection. This lever 147 is in turn pivotally connected at the point 148 in the bracket 149 and the outer end of this lever extends over and rides upon a cam 151 on the shaft 31.

The outer end of the lever 147 is also connected to the spring supporting bar 25 by means of the spring 152 which urges the inner end of said bar downward and, consequently, the cutting bar 143 is urged upward thereby. As the cutting bar 143 is urged upward by the action of the cam upon the inner end of the lever 147, and as its movement is simultaneous with the movement of the lower cutting bar 128, the cutting faces thereof become complementary to the extent that they meet the strands of thread simultaneously and as their opposing faces are in alignment, the thread is caught in the V-shaped knife edges 153 and 154 and as the opening included between these V-shaped edges is reduced until entirely closed, the threads will be severed in a straight clean cut. When the cutting action is complete, the cutting bars 128 and 143 will be returned to their initial position, as shown in Figure 6, by the action of the springs 139 and 152 on the levers 134 and 147, respectively.

Tassel forming mechanism

The bracket 149 is fastened to the rear end of the table 21 and about the center thereof by the bolts 156. This bracket is provided with a horizontally disposed portion 157 which has a slideway 158 for receiving a crosshead 159. The crosshead is held in the slideway by means of the plates 161.

The crosshead has a pivotal connection 162 with a connecting bar 163 which extends toward the front of the machine and has an ogee curve 164 near the outer end thereof. The extreme outer end of the connecting bar 163 has a hook 166 on each side of the same which is adapted to draw the tassel threads downward into the position shown in Figure 12. The inner end of the connecting bar 163 is provided with a cam follower 167 which rides upon the cam 168 secured to the shaft 31. The cam follower has a spiral spring 169 fastened thereto at 171 and to a strap 172 depending from the spring supporting bar 25. The crosshead 159 has a limiting plate 173 at the forward end of the same and its inner end is adapted to be engaged by a cam 174 secured on the shaft 31 and forward movement is thereby imparted to the crosshead and connecting bar 163. Downward movement of the hooks 166 is provided by the action of the cam 168 on the follower 167.

Wire feeding mechanism

The shaft 37 is provided with a cam 176 which engages the upward curved end 177 of the reciprocating bar 178. This bar 178 is slidably and rockably mounted on a stub shaft 179 carried by the brackets 181 mounted on the top of the table 21. The rocking and reciprocating movements are simultaneous in each instance.

The reciprocating bar 178 has a collar 182 on the front side of the same and this collar has a screw 183 to which one end of a spiral spring 184 is attached, the other end of said spring being attached at 186 to the spring supporting bar 25. The forward end of the stub shaft 179 is mounted in a bearing 187 which is mounted on the table 21. The rear side of the reciprocating bar 178 is provided with an integrally formed rearwardly extending arm 188 and the extreme outer end of this bar contacts with a cam 189 mounted on the shaft 31.

One end of a flat spring bar 191 is fastened on the top of the reciprocating bar 178 by means of the screws 192. This spring is bent above the top of the bar 178 to provide a clearance, as shown at 193 in Figure 7, and its outer end is bent at right angles at a point beyond the end of said reciprocating bar to provide the depending leg 194. The flat vertical face of this leg 194 is provided with a clamp plate 196.

The lower side of the bar 178 is also provided with a flat spring bar 197 which is fastened thereto by means of the screws 198 and is provided with a loop or returning curved portion 199. The other end of the spring 197 rests upon the top of a bracket 195 fastened to the table 21 and the extreme outer end is bent at right angles, at a point beyond the end of the reciprocating bar 178, to form the upwardly extending leg 201 whose flat vertical face is provided with a clamp plate 202. These clamp plates 196 and 202 are directly opposed to one another and when the reciprocating bar 178 is in the position shown in Figure 7, there is the maximum space between the same. The springs 193 and 197 are prevented from lateral movement by the plates 200 secured to the bar 178 by the screws 200'.

The wire 205 for binding the tassels is supplied from the spool 203 which is revolubly mounted upon a bracket formed by straps 204 and 206 fastened to the spring supporting bar 25. The wire 205 from this spool passes into a tube 207 which is mounted on a looped supporting strap 208 secured to the straps 204 and 206, and by the spring supporting bar 25. This tube extends to a point slightly at the rear of the normal position of the reciprocating bar 178 and the wire 205 extends from the tube 207 through the guide 209 on the bracket 211 fastened by the bolts 212 to the top of the table 21.

When the cam face 176 engages the curved end 177 of the reciprocating bar 178, said bar will be rocked on the stub shaft 179 and its inner end will be tilted downward. This action will draw the clamp plates 196 and 202 toward one another since the depending leg 194 of the spring 191 rests upon the spring 197, and the end of the latter spring rests upon the bracket 195, so that the wire 205 will be clamped between said plates.

At the time the cam 176 operates to clamp the wire between the plates 196 and 202, the cam 189 on the shaft 31 acts upon the arm 188 and pushes the reciprocating bar 178 forward, so that the wire will emerge from the forward end of the guide 209 and will pass below the path traversed by the tube 57 which carries the tassel threads.

The action of the cams 176 and 189 will end simultaneously and the reciprocating bar 178 will return to the position shown in Figure 7 so as to separate the clamp plates 196 and 202, thereby releasing the wire 205, and the spring 184 will pull the reciprocating bar to its initial position, as illustrated in Figure 1.

It will, of course, be understood that the length of wire extended by this action from the guide 209 will be regulated by the reciprocal movement of the bar 178 on the stub shaft 179 and the extent of this movement will, of course, be regulated by the cam 189 on the shaft 31 so that the length of wire to be severed may be regulated by the substitution of other cams for the cam 189.

The length of wire extended from the guide 209 may also be regulated by changing the face of the cam 176 so that the action of the springs 191 and 197 may be deferred in their action on the clamp plates 196 and 202 until such a point in the reciprocation of the bar 178 as will produce the desired length of wire.

*Wire severing and tassel binding mechanism*

The slot 46 in the wing 44 is somewhat deepened from an intermediate point to the inner end thereof and slidably mounted in this deepened portion is a wire forming bar 213 limited in its rearward movement by the shoulder formed by the deepening of the slot. This bar has a longitudinal slot 215 through the same and through this slot the wire plunger die 214 extends and its outer end is wider at 216, as shown in Figure 5, and is provided at its extremity with a cam follower 217 which rides upon a cam 218 fixed to the shaft 37. The cam follower has an upstanding screw 219 to which one end of a spiral spring 221 is attached. The other end of this spring is fastened to a screw 222 on a wing 223 extending out from the bearing housing 39.

The wire forming bar 213 has a post 224 extending downward therefrom and through a slot 226 in the wing 44 and this post has a screw 227 to which one end of a spiral spring 228 is connected. The other end of this spiral spring is fastened to a screw 229 on the wing 231 of the bearing housing 39. A slideway 232 is mounted on the table 21 and has a plate 234 slidably mounted therein.

A post 236 extending inward from the end of the plate 234 is fastened to the plate by screws 237 extending through a leg 238. The outer end of this plate 234 is provided with a cam follower 239 which is fastened to the plate by screws 241 extending through the pad 242 while the upper portion 243 is laterally offset and is adapted to be engaged by a cam 244 mounted on the shaft 37. The post 236 is in alignment with the post 224 so that when the cam 244 slides the plate 234 inward, the post 236 will move the wire forming bar 213 inward, by reason of the engagement of the posts 224 and 236.

Referring now to Figure 5, the wire forming bar 213 has a cutting knife 246 fastened to the rear side of the same and when the said bar is moved inward, by the action of the cam 244, the knife will pass along the front of the wire guide 209 and will shear the wire at that point.

The inner end of the wire forming bar 213, which has the longitudinal slot 215 therein, is provided on each side of the same with a groove 247 in which the end of the wire 205 rests at the time it is severed by the knife 246. (See Figure 13).

The slot 46 in the wing 43 is provided with a die bar 248 on the outer end of which is a cam follower 249 which has an upstanding screw 251 to which is attached one end of a spiral spring 252. The other end of this spiral spring is attached to a screw 253 on the wing 254 formed on the bearing housing 30'. The cam follower 249 engages a cam 250 secured on the shaft 26.

The inner end of the die bar 248 is forked, as shown in Figures 5 and 13 to 16 inclusive, to form a notch or indentation 256 between the prongs or furcations 257 and 258. The notch or indentation 256 flares outwardly so that the prongs 257 and 258 have convex surfaces. The end wall or surface of the forked portion has two grooves 259 and 261. The grooves are arranged close to each other but at different levels and each groove extends substantially through both prongs and the intermediate indentation or notch. The arrangement of these grooves are precisely the same as the arrangement shown in Figures 26 and 27 of my United States Letters Patent, No. 1,390,267, granted September 13, 1921.

A wire bending post 262 extends upward through the opening 122 in the table 21 and through a hole 263 in the base 40 of the cast member 42 and this post has a pair of collars 264 and 266 secured thereto at a point below the table 21.

The forked or bifurcated end 267 of a crank lever 268 straddles the post 262 between the collars 264 and 266. This lever 268 is pivotally mounted at its offset portion 269 in a bracket 271 which is attached to the lower surface of the table 21. The inner end of this crank lever extends beneath the shaft 31 and is engaged by a cam 272 mounted on said shaft. The extreme end of the lever is connected to the spring supporting bar 25 by a spiral spring 273 which urges the end of said lever upward toward the said bar.

At the moment the wire 205 is severed, as shown in Figure 13, the post 262 is raised by the action of the cam 272 on the lever 268, and as the cam 244 on the shaft 37 continues to move the wire forming bar 213 inward to the position shown in Figure 14, the end of said bar bends the wire around the post 262 and its ends extend into the grooves 259 and 261 in the forked end of the die bar 248.

At this point, the post 262 is lowered and the cam 218 on the shaft 37 pushes the plunger die 214 inwardly so that the central part of the binding wire is engaged by the groove 220 and the ends of the bent wire will be passed around in the grooves 259 and 261 and around the tassel threads so as to completely bind the same on to the loops A. To accomplish this function, the plunger die 214 is pushed forward until it enters the notch 256 in the ends of the die bar 248 and sufficient pressure is exerted by the cam 218 to bind the wire very tightly around the tassel threads.

Figures 13, 14, 15 and 16 show the advance of the parts just described and the finished tassel B is shown in Figures 17 and 18 with the tassel B firmly secured on the loops A.

*Operation of the complete machine*

In starting this machine, the operator stands or sits in front of the revolving disk 81 and places the loops A, which extend from the heading, over the successive bands 82 on the disk 81 and with the heading material between the face of the disk and the wire retaining bar 105. It has been found that in the operation of the machine, the operator usually keeps the machine supplied with three or four loops forward of the loop on which the tassel is being formed. The machine is set in motion by throwing the clutch 27 which operatively connects the pulley 24 with the line shafting through the medium of the belt 23. Shafts 26, 31 and 37 are now set in motion.

The cam 93 on the shaft 31 engages the roller 94 on the lever 91 and pushes the arm 88 forward so that the pawl 87 rotates the shaft 79 and advances the ratchet wheel 96 and disk 81 the distance of one full tooth, when the said ratchet wheel will be positioned and centered by means of the tooth 102 on the arm 101.

This action advances one of the bands 82 on said disc to a position where the opening 83 in the same will be concentric with the opening in the slide 48, as shown in Figure 3. At this point, the cam 66 engages the roller 64 on the inner end of the lever 62 and the forward end of the lever, and by reason of its pivotal connection with the slide through the post 53, pushes said slide toward said disk so that the tube 57 is extended through the opening 83 of said band and through the loops A and the free ends 109 of the tassel threads will ride up the chamfered end 108 on the bar 104 until they rest on the flat surface 107 thereof.

At this moment, the cam 116 on the shaft 26 raises the outer end of the bar 112 which is pivoted at 114 and the clamp 111, formed on the inner end of said bar, will drop downward and engage and firmly hold the thread ends 109 on the flat surface 107 of the bar 104.

Immediately this action takes place, the cam 66 will have concluded its engagement with the roller 64 on the lever 62 and the spiral spring 65 connected to the post 53 and return the slide 48 and tube 57 to the position shown in Figure 3.

The cams 138 and 151, mounted on the shaft 31, now operate their respective levers 134 and 147 by lowering the inner end of the former and raising the inner end of the latter. This action will raise the forward end of the crank lever 134 and as it is connected to the lower cutting bar 128 through the post 132, the cutting bar will be raised in the slideway 127, the forward end of the lever 147 will be lowered and by reason of its engagement with the upper cutting bar 143 through the post 145, said cutting bar will be moved downward in the slideway 142.

The V-shaped knife edges 153 and 154 on the cutting bars 128 and 143, respectively, will catch the extended tassel threads, as shown in Figure 11, and sever these threads a short distance beyond the front of the tube 57.

During the time that the cutting bars have been operated to cut the tassel length, the cam follower 167 has been riding on the reduced part of the cam 168 so that hooks 166 have been elevated from the position shown in Figure 19 and with their open side directly in horizontal alignment with the extended tassel threads.

At the moment when the tassel length is severed, the cam 174 operates the crosshead 159 by pushing the same forward in the slide 158 whereupon, the threads just severed are engaged on both sides of the disk 81 by one of the hooks 166 and the cam 168 then lowers the hooks 166 to pull the tassel ends 109 over the loops A and the spring 169 draws the crosshead 159 backward so that the depending ends of the tassel length extend slightly toward the rear of the machine.

The cam 176 on the shaft 37 having raised the outer end 177 of the reciprocating bar 178, the clamp plates 196 and 202 are pressed together by the action of the springs 193 and 197 and the wire 205 which extends between the same is engaged by said plates and firmly held therebetween.

At this instant, the cam 189 pushes the reciprocating bar 187 forward by its engagement with the rear end of the arm 188 and by this movement, the wire 205 is pulled through the tube 207 and extended through the mouth of the guide 209. After this movement, the cam 176 will sever the wire at the point where it immerges from the guide 209 and the wire will then rest in the groove 247 in the forward end of said forming bar.

While the wire forming bar 213 is moving inward, however, the post 262 is raised directly in front of the longitudinal slot 215 in the same through the medium of the cam 272 which pushes the rear end of the crank lever 268 downward and raises the forked end thereof which straddles the post 262 between the collars 264 and 266. The cam 244 continues to move the bar 213 inward and it is bent over the post 262 and its ends are passed within the slots 259 and 261 in the forked end of the die bar 248 which approaches the said post simultaneous with the approach thereto by the die forming bar 213. The movement of the die forming bar 248 is caused by the action of the cam 250 which is mounted on the shaft 26 and which engages the cam follower 249 on the end of said bar.

Immediately after the ends of the severed wire have been bent over the post 262, and passed into the slots 259 and 261 in the forked end of the die bar 248, the post 262 is lowered out of the sphere of action as the cam 272 permits the raising of the rear end of the lever 268 by the action of the spring 273.

Simultaneous, however, with the lowering of the post 262, the cam 218 on the shaft 37 engages the cam follower 217 on the outer end of the plunger die 214 and said die is pushed forward and the wires engaged in the groove 220 on the end thereof and this die continues to be pressed forward as is the die bar 248 and the die 214 enters the notch or indentation 256 in the forked end of the die bar 248 and pushes the ends of the wires around in their respective grooves 259 and 261 and firmly binds the tassel threads into a tassel, as shown in Figure 16.

It will be, of course, understood that all these described operations have taken place during one rotation of the shaft 31 and immediately the tassel is formed, the die bar 248 is returned to its initial position, as shown in Figure 3, by the tension of the spring 252 which is fastened to the cam follower 249 and to the wing 254 on the bearing housing 30'.

The wire forming bar 213 will be returned to its initial position, as shown in Figure 3, by the action of the spiral spring 228, which is connected to the wing 231 on the bearing housing 39 and the plunger die 214 will be returned to its initial position by the spring 221, which extends between the cam follower 217 and the wing 223 on the bearing housing 39.

The operator continues to place the loops upon the peripherally grooved bands 82 and after the tassels are formed, the heading C passes over a disengaging wire 275 which lies between the said heading and the disk 81 and is held in such position by a screw 276 threaded into the top of the bearing housing 78. This wire 275 will eliminate the necessity of removing the heading and tasseled loops from the disk and the operator can devote her entire attention to placing the loops A on the bands 82.

The disengaging wire is constructed to pass upward from the bearing housing 78 across and then downward parallel with the disk 81 and is spaced from the front of said disk a distance such that it will clear the bands 82 and permit free rotation of the disk. After spanning these bands the wire 275 is bent at an angle so as to bring the end thereof into substantial contact with the face of the disk. The wire may be bent into a loop on this side of the disk which may be of rectangular configuration as shown in Figure 22 and of dimensions to support and define the path of the loop heading C after it is separated thereby from the feed disk. This loop is positioned relative to the disk so as to act on the heading after the tassels have been formed thereon.

The cams are each arranged so that the several operations of the machine are timed in proper sequence to accomplish the successive steps heretofore outlined, and after the die bar and the plunger die have been retracted to their original positions, the cam 93 again engages the roller 94 on the lever 91 and moves the ratchet wheel 86 and the disk 81 around to a point where the succeeding loop is arranged in the line of operation of the tassel thread carrying tube 57.

Of course, the wire which is used for binding the tassel threads may be silk or cotton covered and the color of the covering can be selected to harmonize with the color of the threads composing the tassel.

It is evident that the tasseling machine illustrated herein may be modified and changed in various ways without departing from the invention herein set forth and hereafter claimed.

The invention is hereby claimed as follows:

1. A tasseling machine comprising feeding means for heading loops, means for forming a tassel on each loop, means for securing said tassel on said loop, and means extending between the heading and feeding means for removing the tasseled loops from said feeding means.

2. A tasseling machine comprising feeding means for heading loops, a tassel material holding member, means for reciprocating said member for extending tassel threads through a loop, clamping means for holding said extended threads, cutting bars for severing the threads, means for forming the threads into a tassel, and means for binding said tassel into said loop.

3. A tasseling machine comprising feeding means for heading loops, a member for extending tassel threads through a loop, clamping means for seizing and holding said threads after being so extended, means for severing the threads, while held by the clamping means, means for forming the threads into a tassel, and means for binding said tassel onto said loop.

4. A tasseling machine comprising feeding means for heading loops, a reciprocating member for extending tassel threads through a loop, clamping means operable after the threads are so extended for holding said threads in extended position, means for severing the threads, means for forming the threads into a tassel, and means for binding said tassel into said loop.

5. A tasseling machine comprising feeding means for heading loops, a means for feeding tassel threads through a loop, clamping means for holding threads extended from said means, cooperating sliding cutting bars for severing the threads, means comprising hook members for forming the threads into a tassel, and means for binding said tassel onto said loop.

6. A tasseling machine comprising feeding means for heading loops, a member for extending tassel threads through a loop, clamping means for holding said extended threads, cutting bars for severing the threads, hook members mounted for sliding and angular movement, means operable to first bring the hooks to a position above the severed threads, then into position to grip the threads and then moving the hooks to draw the severed threads downward and rearward for forming the threads into a tassel, and means for binding said tassel into said loop.

7. A tasseling machine comprising feeding means for heading loops, a tassel thread holder member, means for moving said member for positioning tassel threads transversely through a loop, with portions projecting on both sides thereof clamping means for holding the threads, means for severing the threads, hooked members mounted for sliding and angular movement in planes on opposite sides of the loop, rotatable cams successively operating to cause said members to grip the projecting portions of the threads on both sides of the loop and then draw said threads into parallelism to form a tassel, and means for binding said tassel onto said loop.

8. A tasseling machine including a rotary means, means thereon for holding a plurality of loops, a cam operated reciprocating tube for extending tassel threads through a loop, means for holding said extended threads during the retraction of said tube, cutting bars for severing the threads, means for forming the threads into a tassel, and means for binding said tassel onto said loop.

9. A tasseling machine comprising a rotary feeding means adapted for holding and successively feeding a plurality of heading loops, a cam operated reciprocating tube for projecting tassel threads through successive loops, means comprising a cam operated clamp for holding threads extending from the tube during the retraction of said tube, cutting bars for severing the threads, means for forming the threads into a tassel, and means for binding said tassel onto said loop.

10. A tasseling machine comprising rotary means constructed to hold and successively feed a plurality of heading loops, a cam operated reciprocating tube for extending tassel threads horizontally through a loop, means for holding said extended threads during the retraction of said tube, cutting means for severing the threads, means for forming the threads into a tassel, and means for binding said tassel onto said loop.

11. A tasseling machine comprising rotary feeding means for heading loops constructed peripherally to hold a plurality of loops simultaneously thereon, a cam operated reciprocating tube for extending tassel threads horizontally through a loop, means comprising a cam operated clamp for holding said extended threads during the retraction of said tube, cutting means for severing the threads, means for forming the threads into a tassel, and means for binding said tassel onto said loop.

12. A tasseling machine comprising moving feeding means for heading loops, means for extending tassel threads through a loop, clamping means for holding said extended threads, cutting bars for severing the threads, means for forming the threads into a tassel, means for binding said tassel onto said loop, and means positioned adjacent the feeding means and operable incident to the feeding means for dislodging the tasseled loops from said feeding means.

13. A tasseling machine comprising means for sustaining a plurality of loops in open or spread position, means for intermittently and successively moving said loops to feeding position, means for forming tassel material over said positioned loops, means for feeding a fastening wire in position relative to the positioned material, means for severing the required length of wire, a post, grooved dies one of which bends the severed wire over the post and extends the ends into grooves in the other die, and a plunger die cooperating with the last named die for securely bending said wire around said tassel threads.

14. A tasseling machine comprising means for sustaining a plurality of loops in open or spread position, means for intermittently and successively moving said loops to feeding position, means for forming tassel material over said positioned loops, means for feeding a fastening wire in position relative to the positioned material, means for severing the required length of wire, a post, reciprocating grooved dies one of which bends the severed wire over the post and extends the ends into grooves in the other die, and a plunger die cooperating with the last named die operable after the ends of the wire are so extended and for securely bending said wire around said tassel threads.

15. A tasseling machine comprising means for sustaining a plurality of loops in open or spread position, means for intermittently and successively moving said loops to feeding position, means for forming tassel material over said positioned loops, means for feeding a fastening wire in position relative to the positioned material, means for severing the required length of wire, a post, grooved dies one of which bends the severed wire over the post and extends the ends into grooves in the other die, a recess in said last die, and a plunger die operable after the ends of the wire are so extended and adapted to press the tassel threads into said recess and securely bind the wire length around the same.

16. A tasseling machine comprising means for sustaining a plurality of loops in open or spread position, means for intermittently and successively moving said loops to feeding position, means for forming tassel material over said positioned loops, means for feeding a fastening wire in position relative to the positioned material, means for severing the required length of wire, a post, grooved dies one of which bends the severed wire over the post and extends the ends into grooves in the other die, a plunger die cooperating with the last named die for securely bending said wire around said tassel threads, and means extending beneath the heading for severing the tasseled loops from the loop feeding means.

17. A tasseling machine as described in claim 2, having means for feeding a fastening wire, means for severing the required length of wire, a post, grooved dies one of which bends the severed wire over the post and extends the ends into grooves in the other die, a recess in said last die, a plunger die adapted to press the tassel threads into said recess and securely bind the wire length around the same, and means adjacent the feeding means and extending between the same and the heading for automatically removing the tasseled loops from the loop feeding means.

18. In a machine of the class described, a rotary feeding disk having peripherally grooved bands for supporting heading loops, means for forming a tassel on the lower loop, and automatic means for rotating said disk to position the succeeding loop for tasseling.

19. In a machine of the class described, a rotary feeding disk having peripherally grooved bands for supporting heading loops, means for forming a tassel on the lower loop, and automatic means comprising a cam actuated ratched wheel for rotating said disk to position the succeeding loop for tasseling.

20. In a machine of the class described, a rotary feeding disk having peripherally grooved bands for supporting heading loops, means for forming a tassel on the lower loop, automatic means for rotating said disk to position the succeeding loop for tasseling, and means for automatically removing the tasseled loops for the grooved bands.

21. A tasseling machine comprising a feeding means for heading loops, means for forming a tassel on each loop, means for securing said tassel on said loop, and means extending at an angle to the feeding means and positioned to project between the heading loops and the feeding means for automatically removing the loops from the feeding means after the tassel is formed.

22. A tasseling machine comprising feeding means for heading loops, means for forming a tassel on each loop, means for securing said tassel on said loop, and means positioned to extend beneath the heading for separating the loops from the feeding means after the tassels are formed.

23. A tasseling machine comprising means for supporting a plurality of tassel receiving heading loops, means for feeding said loops to position to be acted upon, and means for successively forming a tassel on each of said tassel receiving heading loops while the loop being acted upon is on the supporting means.

24. A tasseling machine comprising mechanism for continuously and successively feeding heading loops, means for forming a tassel on the loop of a heading, traveling means for moving said loops to and from position to be operated on by said tassel forming mechanism, and means positioned to extend beneath the heading after the tassel has been formed for removing the heading from the traveling means after the tassel has been formed.

25. A machine for forming tassels on a heading, including tassel forming mechanism, loop feeding means for intermittently and successively moving the heading to position to be operated on by said tassel forming mechanism, and a member positioned to lie between the feeding means and said heading subsequently to the position for the forming of said tassel and operating to remove the heading from the feeding means.

26. In a machine for forming tassels on a heading having means for forming said tassels and feeding means arranged for moving the heading into position for operation thereupon by the tassel forming means, a member positioned adjacent the feeding means and between the heading and feeding means for causing a divergence in the paths of travel of the heading and feeding means.

27. A machine for forming tassels on a heading, including mechanism operable for forming the tassels on said heading, conveying means for moving the heading to and from position to be operated upon by said mechanism, and stationary means in the path of the heading operating incident to the movement of the conveying means for dislodging the heading from the conveying means.

28. A machine for forming tassels on the loops of a heading, including a feeding member having means thereon for holding the loops thereon and for sustaining said loops in open position, means for forming tassels on said loops, and a member extending at an angle across the path of the heading and into contact with the feeding member.

29. A machine, for forming tassels on the loops of a heading, including a feeding member having means thereon for holding the loops thereon, means for passing tassel material through the loops, means for forming tassels on said loops, and a looped member extending at an angle across the path of the heading and into contact with the feeding member.

30. A tasseling machine including a rotary disk having a plurality of means for holding heading loops thereon, means for extending tassel threads through the loops, means for severing the threads, and means for forming the severed threads into a tassel.

31. A tasseling machine including a rotary disk having a plurality of means for holding heading loops thereon, means for extending tassel threads through the loops, means for severing the threads, means for forming the severed threads into a tassel, and means rotating the disk intermittently for bringing the various loops successively into the path of the thread extending means.

32. A tasseling machine including a rotatable disk having a plurality of heading loop carriers thereon, a thread projecting means movable transversely of the path of said loop carriers, means for operating the projecting means in timed-relation to the movement of the carriers across their path of travel, means for severing the threads, and means for forming the severed threads into a tassel.

33. A tasseling machine including a rotary disk having a plurality of heading loop holding means with openings peripherally thereof, a tassel thread feeding means movable across the path of travel of said holding means, means for moving the feeding means across said path in timed-relation to the arrival of each loop holding means in the path of travel of the feeding means, means for severing the threads, and means for forming the severed threads into a tassel.

34. A tasseling machine including a rotary disk having a plurality of loop holding means in the nature of open sided bands with the openings peripherally thereof, a tassel thread feeding means movable across the path of travel of said holding means, means for moving the feeding means across said path in timed-relation to the arrival of each loop holding means in the path of travel of the feeding means, means for severing the threads, and means for forming the severed threads into a tassel.

35. A tasseling machine including a rotary disk having a plurality of peripheral loop holding means comprising open sided grooved bands, a tassel thread feeding means movable across the path of travel of said holding means, means for moving the feeding means across said path in timed-relation to the arrival of each loop holding means in the path of travel of the feeding means, means for severing the threads, and means for forming the severed threads into a tassel.

36. A tasseling machine including a rotary disk having spaced notches surrounded on one surface of the disk with bands forming loop holding means and open at the periphery of the disk, a tassel thread feeding means movable across the path of travel of said holding means, means for moving the feeding means across said path in timed-relation to the arrival of each loop holding means in the path of travel of the feeding means, means for severing the threads, and means for forming the severed threads into a tassel.

37. A tasseling machine including a plurality of loop holding means, means movable in a path for feeding tasseling threads through said loops, means for moving said loop holding means successively across said path, means for severing the threads after projection through a loop, and means for forming the threads into a tassel after being severed.

38. A tasseling machine including a plurality of loop holding means, means movable in a path for feeding tasseling threads through said loops, means for moving said loop holding means in intermittent succession into said path, means for severing the threads after projection through a loop, and means for forming the threads into a tassel after being severed.

39. A tasseling machine including means for moving heading loops along a course, means including a slide for projecting tassel threads transversely of said course and through said loops, means for feeding threads in superposed layers into said slide, means for severing the threads, and means for forming the threads into tassels after being severed.

40. A tasseling machine including means for moving heading loops along a course, means including a reciprocally mounted tube for projecting tassel threads transversely of said course and through said loops, means for feeding threads into said tube in superposed layers, means for severing the threads, and means for forming the threads into tassels after being severed.

41. A tasseling machine including means for moving heading loops along a course, means including a reciprocally mounted tube transversely oval in cross-section for projecting tassel threads transversely of said course and through said loops, means for feeding threads into said tube in superposed layers, means for severing the threads, and means for forming the threads into tassels after being severed.

42. A tasseling machine including means for moving heading loops along a course, a reciprocal slide having a thread feeding tube projecting therefrom and adapted to be projected by said slide through said loops, threads in said tube, means for severing the threads, and means for forming the threads into tassels after being severed.

43. A tasseling machine including means for moving heading loops along a course, a reciprocal slide having a thread feeding tube projecting therefrom and adapted to be projected by said slide through said loops, threads in said tube, means for holding the threads while the tube is retracted, means for severing the threads, and means for forming the threads into tassels after being severed.

44. A tasseling machine including means for successively moving a plurality of heading loops along a course, means for extending tassel threads through the loops, comprising a reciprocal slide, a source of cotton thread, a source of silk thread, means for guiding the thread onto the slide with one kind of thread superposed on the other, means for severing the threads, and means for forming the threads into tassels after being severed.

45. A tasseling machine including means for moving headed loops along a course, means including a slide for projecting tassel threads transversely of said loops, a plurality of sources of thread, said slide having a bore longitudinally thereof and spaced apertures through the top wall thereof communicating with the bore through which the thread from the several sources are respectively fed to the interior of the bore in superposed layers, means for severing the thread after being projected through the loops, and means for forming the severed thread into tassels after being projected through the loops and severed.

46. A tasseling machine including a loop feeding means, means including a slide for feeding tassel thread from a plurality of sources transversely through the loops, a plurality of sources of thread, a spool over which the thread is trained in passing from the sources thereof, a dividing flange for separating the threads from the various sources on said spool, means for positioning the thread from the various sources in the slide in superposed layers, means for severing the thread after being projected through the loop, and means for forming the thread into tassels after being severed.

47. A tassel forming machine including means for moving heading loops into position to receive tassels, supporting means for tassel thread, reciprocally mounted means for projecting the supporting means through the loops when in said position, means for retracting the holding means, means for holding the thread while the supporting means is being retracted, means spaced from the extreme retracted position of the supporting means for severing the thread, and means operating the severing means when the supporting means is retracted to its extreme position.

48. A tassel forming machine including means for presenting loops in a vertical plane, means reciprocal in a horizontal plane for carrying tassel thread through said loops, and means operable when the reciprocal means has reached its forward position for seizing said threads and holding them until the carrying means is retracted to its limit, means for severing the threads operable when this limit is reached, said severing means being spaced forwardly of said position, and means for forming the threads into a tassel when severed.

49. A tassel forming machine including means for moving loops successively into position to have tassels formed thereon, said means presenting the loops in a vertical plane, means acting transversely of said plane for feeding strands of tassel thread through the loops, means for severing said thread, means for moving the threads on both sides of the loops downwardly into parallelism, and means for binding the threads so formed into tassels.

50. A tassel forming machine including means for moving loops successively into position to have tassels formed thereon, means operable transversely of the plane of said loops when in said position for feeding tassel thread therethrough, hooked means movable in parallelism to the plane of said loops and on both sides thereof for bringing the threads on both sides of the loop into parallelism, and means binding the threads so positioned into tassels, all of the movement of said hooked means being in the same plane.

51. A tassel forming machine including means for supporting a plurality of loops and movable in a certain plane to present loops intermittently and automatically in position to have tassels formed thereon, means operable transversely of said plane to feed tassel threads through said loops, a pair of hooks reciprocal in planes at either side of the first named means, all the movements of said hooks being in vertical planes.

52. In a tasseling machine, means for forming a tassel and means for securing a binding wire about the tassel so formed, said means consisting of wire feeding means, a pair of oppositely slidable dies, and a plunger slidable relative to one of the dies and adapted to complete the bending of the wire within the other die, and sliding means engaging the tassel during the wire binding operation.

53. A tasseling machine comprising an endless feeding means having means for holding a plurality of heading loops thereon and movable intermittently to bring the loops successively into tassel forming position, a tubular member reciprocal through said loop when in said position, and means for feeding tasseling thread into said tube, means for gripping the ends of the thread after being projected through a loop and holding the same while the tube is being retracted, means for severing the threads at a distance spaced from the forward end of the tube and operable when the tube is in its extreme retracted position, and means for forming the threads into a tassel on said loop.

54. A tasseling machine comprising an endless feeding means having means for holding a plurality of heading loops thereon, and movable intermittently to bring the loops successively into tassel forming position, a tubular member reciprocal through said loops when in said position, means for feeding tasseling thread into said tube, said tasseling thread being supplied from a plurality of sources, means associated with the tube for positioning the threads in layers within the tube, means for gripping the ends of the thread after being projected through a loop and holding the same while the tube is being retracted, means for severing the threads at a distance spaced from the forward end of the tube and operable when the tube is in its extreme retracted position, and means for forming the threads into a tassel on said loop.

55. A tasseling machine comprising rotary feeding means for heading loops, means for connecting a plurality of loops thereto in position to be fed thereby successively to position to be operated upon, means for extending tassel threads transversely through each loop when it comes to said position, and means for forming the threads into a tassel.

56. A tassel machine comprising means for supporting a plurality of heading loops, feeding means for operating the first named means for successively bringing loops to position to be acted upon, and means for forming tassels on said loops.

57. A tasseling machine comprising means for supporting a heading loop, means for operating the first named means intermittently in one direction to bring said loop in position to be acted upon, and means for forming a tassel on said loop.

58. A tasseling machine comprising means for supporting a plurality of heading loops at one time, means for operating the first named means intermittently to bring one of said loops in position to be acted upon, means for forming a tassel on said last named loop, and means for wire binding said tassel and means removing the wire bound tassel from the supporting means.

59. A tasseling machine comprising rotary means for supporting a heading loop, means for rotating the first named means intermittently to bring said loop in position to be acted upon, means for forming a tassel on said loop, means for wire binding said tassel, and means for trimming the finished tassel.

60. A tasseling machine comprising means for supporting a heading loop, means for operating the first named means intermittently to bring said loop in position to be acted upon, means for forming a tassel on said loop, means for wire binding said tassel, means for trimming the finished tassel, and heading removing means for removing the heading from said supporting means after the tassel is trimmed.

61. In combination, feeding means for a heading having loops, means on said feeding means for sustaining a loop in open position, means for intermittently and successively operating the feeding means to bring the heading in proper position to be acted upon, means for passing tassel material through a loop, means for severing a predetermined length from said material, means for forming the severed material over the loop, means for wire binding the formed material to make a tassel, and means for trimming the tassel.

62. Means for feeding tassel-tuft material in a tassel-making machine, comprising a tube through which the material is passed, means for reciprocating said tube, and means for holding the end of the material when the tube has moved to its extreme feeding position.

63. In a tassel forming machine, means for feeding tassel-tuft material comprising a tube through which the material is passed, means for reciprocating said tube, means for holding the end of the material when the tube has moved to its extreme feeding position, and means for severing the advanced portion of the material when the tube has retreated from feeding position.

64. In a tassel forming machine, means for feeding heading having a loop to position to have a tassel formed on the loop, means for feeding tassel material to forming position relative to the loop, said last named means comprising a tube through which the tassel material is passed, means for reciprocating the tube, and means for holding the end of the material when the tube has moved to its extreme feeding position.

65. In a tassel forming machine, means for feeding heading having loops formed thereon to position to have tassels formed on the loops, means for feeding tassel material to forming position relative to the loops on the heading, said last named means comprising a tube through which the tassel material is passed, means for reciprocating the tube through a said loop, and means for holding the end of the material when the tube moves from feeding position.

66. In a tassel forming machine, means for feeding heading having loops formed thereon to position to have tassels formed on the loops, means for feeding tassel material to forming position relative to the loops on the heading, said last named means comprising a tube through which the tassel material is passed, means for reciprocating the tube through a said loop, means for holding the end of the material when the tube moves from feeding position, means for forming a tassel on the said loop, and means for severing the advanced portion of the material when the tube has retreated from feeding position.

In testimony whereof I have signed my name to this specification.

CLARENCE F. ARNOLD.